United States Patent [19]

Membrino

[11] 3,913,031

[45] Oct. 14, 1975

[54] PSEUDO NOISE MODULATOR

[75] Inventor: Robert J. Membrino, Silver Spring, Md.

[73] Assignee: The Singer Company, New York, N.Y.

[22] Filed: Aug. 19, 1974

[21] Appl. No.: 498,316

[52] U.S. Cl. .................................... 331/78; 235/152

[51] Int. Cl.² ........................................... H03B 29/00

[58] Field of Search ......................... 331/78; 235/152

[56] References Cited

UNITED STATES PATENTS

| | | | |
|---|---|---|---|
| 3,612,845 | 10/1971 | Lawlor | 331/78 X |
| 3,790,768 | 2/1974 | Chevalier et al. | 331/78 X |

*Primary Examiner*—Siegfried H. Grimm

*Attorney, Agent, or Firm*—William Grobman; James C. Kesterson

[57] ABSTRACT

This invention provides a relatively simple system for supplying digitally controlled amounts of noise-to-analog signals. The system includes a random noise generator which comprises a plurality of individual generators, means for digitally controlling the operation of each of those noise generators, a source of digital data to which the noise is to be added, a digital adder to which both the noise and the data is supplied, and a digital-to-analog converter which converts output from the digital adder into an analog signal which contains the desired proportion of noise.

9 Claims, 1 Drawing Figure

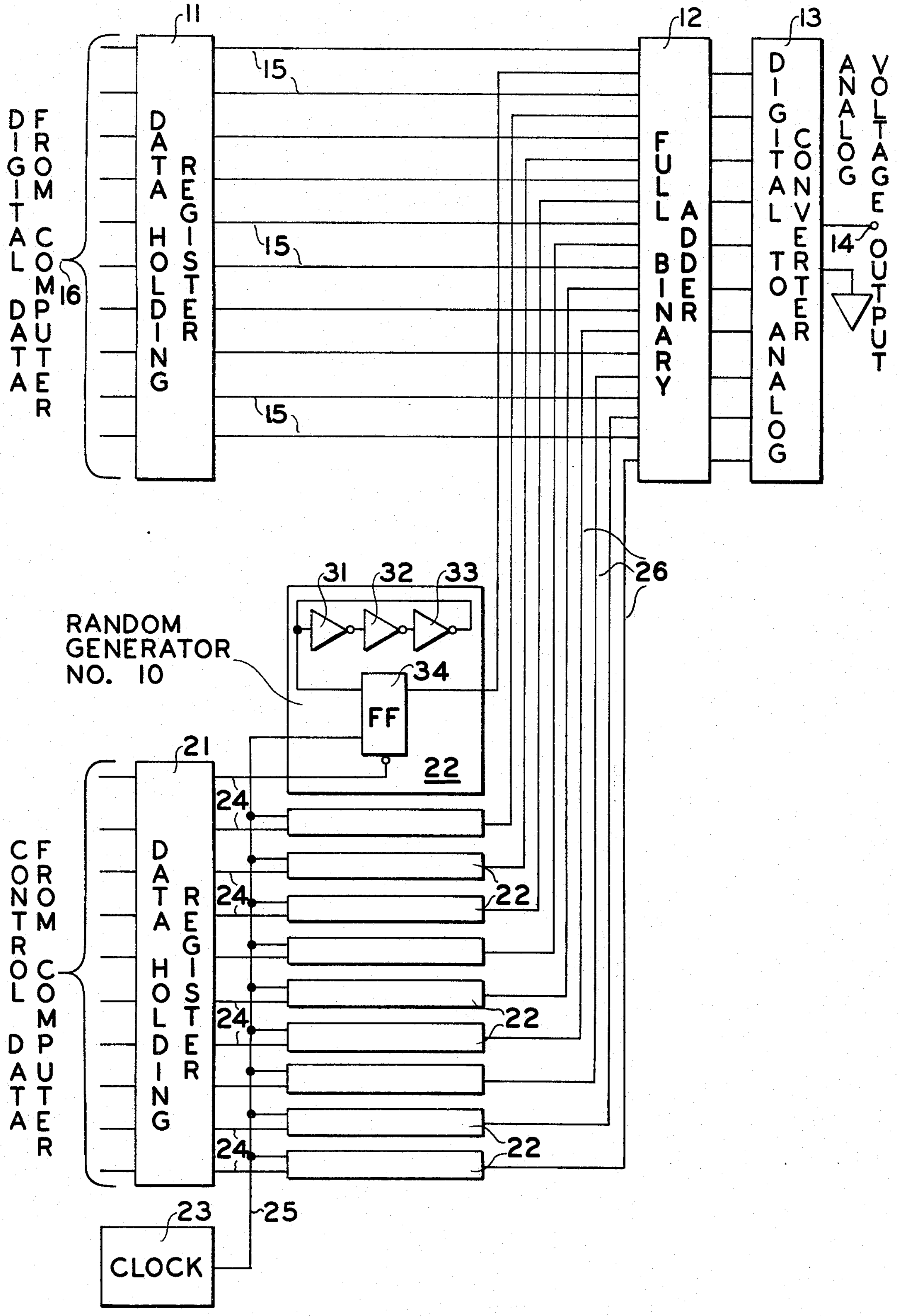
11
12
13
15
15
15
DIGITAL DATA FROM COMPUTER
16
DATA HOLDING REGISTER
FULL BINARY ADDER
DIGITAL TO ANALOG CONVERTER
ANALOG VOLTAGE OUTPUT
14
26
31
32
33
34
FF
RANDOM GENERATOR NO. 10
22
21
24
24
24
24
22
22
22
22
CONTROL DATA FROM COMPUTER
DATA HOLDING REGISTER
23
CLOCK
25

PSEUDO NOISE MODULATOR

BACKGROUND OF THE INVENTION

1. Field of the Invention

This invention relates to systems for mixing signals of different types, and more particularly to systems for supplying a selected ratio of noise to an existing signal.

There are many times when it is desirable to produce a final signal or wave form which is the composite of two or more different signals. An early example of such a system is found in modulated communication systems such as radio transmission equipment. In radio broadcast systems, an audio or other communication system is modulated onto a high frequency carrier signal which is used to transport the intelligence over great distances. Modulation has also been used in communications to enable the transmission of intelligence from many sources having similar band widths to be transmitted over a single communication channel such as a coaxial cable.

In addition to communication systems, in training systems, including simulators, it is very often desirable to duplicate existing signals which contain noise. In some systems the amount of noise varies with conditions. For example, in radar systems the noise which is known as "sea clutter" is much more prominent close to the radar antenna than it is at a distance. In the simulation of marine radar, it is necessary to control the amount of noise which is added to the composite radar signal.

2. Description of the Prior Art

In the past the insertion of noise into an information signal was usually crudely performed. Often the noise was merely switched in or out with no control over its amplitude. In some systems, the amplitude of the noise was controlled by mechanical means such as potentiometers. The one common characteristic of prior art for adding noise to information signals was the poor resolution in the noise levels.

SUMMARY OF THE INVENTION

This invention comprises a digital system for adding controlled amounts of noise to information signals to produce an analog signal which has a desired signal-to-noise ratio. This system includes a string of digitally related noise generators which are controlled by input signals. The output from the noise generators is combined with a digital information signal, and the combination is then converted to an analog signal which contains the desired ratio of noise.

It is an object of this invention to provide a new and improved signal combining system.

It is another object of this invention to provide a new and improved system for combining a desired amount of noise with an information signal.

It is a further object of this invention to provide a new and improved digitally controlled system for combining selected amounts of noise with an information signal.

It is still another object of this invention to provide a new and improved digital system for combining digitally related amounts of noise to a digital information signal and to produce a resulting analog signal having a desired noise ratio.

Other objects and advantages of this invention will become more apparent as the following description proceeds, which description should be considered together with the accompanying drawings.

BRIEF DESCRIPTION OF THE DRAWING

The single FIGURE of the drawing is a block diagram of a preferred embodiment of the system of this invention.

DESCRIPTION OF A PREFERRED EMBODIMENT

Referring now to the drawing in detail, the reference character 11 designates a register which receives digital information from any suitable source of such information. The output from the register 11 is applied in parallel over lines 15 to one input of a full binary adder 12. A second register 21 receives digital control data from any suitable source of such data and applies that data to the inputs of individual noise generators 22. A source 23 applies clock pulses through a line 25 to inputs of all of the noise generators 22. The outputs from the individual noise generators 22 are applied over lines 26 to the other inputs of the adder 12. The outputs from the adder 12 are applied in parallel to the inputs of a digital-to-analog converter 13. The output from the D/A converter 13 is applied between an output terminal 14 and ground.

Each of the noise generators 22 includes a train of inverting amplifiers 31, 32, and 33 with the output of amplifier 31 connected to the input of amplifier 32, the output of amplifier 32 connected to the input of amplifier 33, and the output of amplifier 33 connected to the input of amplifier 31. The output of the amplifier 33 is also connected to the set input of a flip-flop 34 whose clock input is connected to the line 25 from the source of clock pulses 23. The set output of the flip-flop 34 is connected to an input of the adder 12. The restore, or clear, input of the flip-flop 34 is connected to an output of the register 21.

In operation, the three amplifiers 31, 32, and 33 which are connected in a ring form a very high frequency oscillator whose oscillating frequency is determined only by the operating time of the three amplifiers. Every time the output from the amplifier 33 goes positive it applies a positive-going leading edge to the set input of the flip-flop 34. The flip-flop 34 is of the type which is set by the leading edge. The clock 23 generates clock pulses at a regular rate which is much less than the frequency of the oscillator 22. The pulses coming from the clock 23 are applied to the clock, or trigger, inputs of the flip-flop 34. When the pulse from the clock 23 is applied to the flip-flop 34 at the same time that the set input to the flip-flop 34 receives a high signal 1 from the amplifier 33, the flip-flop 34 is set. Should the clock pulse be applied to the flip-flop 34 at any other time, the flip-flop will remain in its restored state. This operation takes place only when there is no clear signal from the register 21 applied to the restore input of the flip-flop 34. Since the only output from the oscillator 22 comes from set output of the flip-flop 34, the presence or absence of a clear pulse from the register 21 determines whether or not there is an output from each of the oscillators 22.

Assume that only the lowest noise generator 22 has a 1 applied to it from the register 21 (1=ON) and that all of the other generators 22 have 0's applied to them from the register 21. Noise will be applied to only one input of the adder 12; all other inputs will not receive any noise. The noise which is applied to the noise inputs of the adder 12 is added in the adder to the digital inputs from the register 11 to produce noise modulated outputs from the adder 12. The outputs from the adder 12 are applied to the inputs of the digital-to-analog converter 13 to produce an analog output signal whose amplitude is instantaneously determined by the sum of the inputs applied to the adder 12.

Each of the inputs to the registers 11 and 21, and each of the outputs from the individual oscillators 22, as well as each of the inputs to the D/A 13 is weighted in accordance with the digital radix being used. Thus, assuming that the radix is 2, then the top outputs from the two registers 11 and 21 and the top output from the noise generator 22 supplies one-half of their respective values. Each of the other outputs supplies one-half of the values of the remainder. Thus, if only a small amount of noise is to be added to the data contained in the register 11, then only the bottom one or two noise generators 22 are permitted to produce output signals. If, on the other hand, the amount of noise to be supplied is to equal the value of the information, then more of the generators 22 are permitted to supply energy to their respective inputs of the adder 12. In this manner, by varying the combinations of the noise generators 22 which supply inputs to the adder 12, the ratio of the noise to the signal can be readily adjusted. The means for controlling the signal-to-noise ratio is the digital word which is inserted into the register 21. As indicated above, the register 21 is a multi-bit register in which outputs are taken from each bit position. There is one control bit in the register 21 for each noise generator 22. Whenever a 0 is inserted into a bit position in the register 21, the corresponding noise generator 22 is prevented from producing an output on the line 26. By the same token, whenever a 1 appears in a particular position in the register 21, the corresponding noise generator 22 produces an output which is applied to the line 26. The noise produced by the individual noise generators 22 is added to the corresponding information bits contained in the register 11. The output from each stage of the parallel adder 12 is the sum of that order bit stored in the register 11 and that order noise. If the bit is 0, then thé sum output from that stage only is noise. Since the sum outputs from the adder 12 serve as digital inputs to the D/A converter 13, which are integrated by the converter 13 to produce an output voltage which is proportioned at each instant to the sum of the inputs, those inputs which are nothing but noise contribute to the final output at the terminal 14.

The above specification has described a new and improved system for controlling the amount of noise which is added to an information signal. It is realized that a reading of the above description may indicate to those skilled in the art additional ways in which the system of this invention may be used without departing from its principles. It is, therefore, intended that this invention be limited only by the scope of the appended claims.

What is claimed is:

1. A digitally controlled system for applying a selected amount of noise to an information signal, said system comprising:

a. a plurality of digitally controlled noise generators;
b. means for applying a digital signal to each of said generators to turn on and off the output of said generators;
c. a multi-digit full parallel adder having a first set of inputs and a second set of inputs and a third set of outputs;
d. means for applying the outputs from said generators to said second set of inputs;
e. a source of information signals having its outputs applied to said first set of inputs;
f. a multi-input digital-to-analog converter; and
g. means for connecting said third set of outputs from said adder to the inputs of said converter whereby the output from said converter comprises a voltage whose amplitude depends upon the sum output of said adder.

2. The system defined in claim 1 wherein each of said noise generators includes an oscillator and a control means.

3. The system defined in claim 2 wherein said control means includes means for connecting said oscillator to the output of said generator.

4. The system defined in claim 2 wherein said oscillator comprises an odd number of inverting amplifiers connected in series, and positive feedback means for connecting the output of the last amplifier to the input of the first amplifier in the series.

5. The system defined in claim 3 wherein said oscillator comprises an odd number of inverting amplifiers connected in series, and positive feedback means for connecting the output of its last amplifier in the series to the input of the first amplifier in the series.

6. The system defined in claim 5 wherein said control means comprises a clocked flip-flop having a set input, a restore input and a clock input, means for connecting the output of the last amplifier in said series to said set input, and means for applying said digital signal to said restore input.

7. The system defined in claim 6 further including a source of clock pulses, and means for connecting the output of said source to said clock input.

8. The system defined in claim 7 wherein said flip-flop includes a set output, and means for connecting said set output to one of said second set of inputs.

9. The system defined in claim 8 wherein said means for applying a signal to said noise generators comprises a source of control works and a register for temporarily storing said control words.

* * * * *

UNITED STATES PATENT OFFICE

CERTIFICATE OF CORRECTION

Patent No. 3,913,031 Dated October 14, 1975

Inventor(s) Robert J. Membrino

It is certified that error appears in the above-identified patent and that said Letters Patent are hereby corrected as shown below:

Column 4, line 53, "works" should be --words--.

Signed and Sealed this

*thirteenth* Day of *January 1976*

[SEAL]

*Attest:*

RUTH C. MASON
*Attesting Officer*

C. MARSHALL DANN
*Commissioner of Patents and Trademarks*